United States Patent [19]

Wegener et al.

[11] Patent Number: 5,709,509
[45] Date of Patent: Jan. 20, 1998

[54] CUTTING INSERT

[75] Inventors: Manfred Wegener, Essen; Rainer Von Haas, Geesthacht, both of Germany

[73] Assignee: Widia GmbH, Essen, Germany

[21] Appl. No.: 436,329

[22] PCT Filed: Nov. 18, 1993

[86] PCT No.: PCT/DE93/01109

§ 371 Date: May 11, 1995

§ 102(e) Date: May 11, 1995

[87] PCT Pub. No.: WO94/12303

PCT Pub. Date: Jun. 9, 1994

[30] Foreign Application Priority Data

Nov. 21, 1992 [DE] Germany .......................... 9215855 U

[51] Int. Cl.$^6$ .................................................. B23B 27/22
[52] U.S. Cl. ........................... 407/114; 407/115; 407/116
[58] Field of Search .......................... 407/114, 115, 407/116, 113, 100, 34, 48, 120

[56] References Cited

U.S. PATENT DOCUMENTS

| 3,381,349 | 5/1968 | Newcomer | 407/114 X |
| 4,214,845 | 7/1980 | Mori . | |
| 4,632,608 | 12/1986 | Blomberg et al. | 407/114 |
| 4,648,760 | 3/1987 | Karlsson et al. | 407/113 X |
| 4,880,338 | 11/1989 | Stashko . | |
| 4,934,879 | 6/1990 | van Barneveld | 407/115 X |
| 4,988,242 | 1/1991 | Pettersson et al. | 407/116 X |
| 5,203,649 | 4/1993 | Hatbi et al. | 407/114 |
| 5,525,016 | 6/1996 | Paya et al. | 407/116 |

FOREIGN PATENT DOCUMENTS

| 385 222 B | 3/1988 | Australia . | |
| 0 168 555 | 1/1986 | European Pat. Off. . | |
| 0 222 317 A1 | 5/1987 | European Pat. Off. . | |
| 314647 | 5/1989 | European Pat. Off. | 407/120 |
| 0332283 | 9/1989 | European Pat. Off. | 407/115 |
| 0 208 668 B1 | 4/1990 | European Pat. Off. . | |
| 2 231 631 | 2/1973 | Germany . | |
| 23 57 180 B2 | 5/1975 | Germany . | |
| 25 15 686 B2 | 11/1975 | Germany . | |
| 25 44 991 C2 | 3/1977 | Germany . | |
| 28 45 211 A1 | 4/1979 | Germany . | |
| 31 48 535 C2 | 7/1983 | Germany . | |
| 260 238 A1 | 9/1988 | Germany . | |
| 0266293 | 3/1989 | Germany | 407/113 |
| 59-16910 | 1/1984 | Japan . | |
| 1 125 064 | 8/1968 | United Kingdom . | |
| 2 116 082 | 9/1983 | United Kingdom . | |

OTHER PUBLICATIONS

1991 Derwent Publications LTD Week/Issued 9142/04 Dec. 91 "Multi-edge cutting plate".

*Primary Examiner*—Daniel W. Howell
*Assistant Examiner*—Henry W. H. Tsai
*Attorney, Agent, or Firm*—Herbert Dubno; Andrew Wilford

[57] ABSTRACT

A cutting insert for material-removing machining is formed with at least one transversely extending cutting edge, a transversely extending inner groove extending along and generally the full length of the cutting edge and having an outer edge and an inner edge spaced longitudinally from the outer edge and lying between the outer edge and the cutting edge, and an outer transversely extending groove extending along and generally the full length of the cutting edge and having an outer edge and an inner edge spaced longitudinally from the respective outer edge. The inner groove lies between the outer groove and the land. A transversely extending land surface extends immediately adjacent the cutting edge along the cutting edge between the inner groove and the cutting edge. A row of transversely spaced outer chip-forming elements lie wholly between the outer-groove outer edge and the inner-groove inner edge.

20 Claims, 8 Drawing Sheets

CUTTING INSERT

CROSS REFERENCE TO RELATED APPLICATIONS

This application is the US national phase of PCT application PCT/DE93/01109 filed 18 Nov. 1993 with a claim to the priority of German application G 92 15 855.2 filed 21 Nov. 1992.

FIELD OF THE INVENTION

The invention relates a cutting insert for material-removing machining, in particular drilling, with at least one cutting edge, a land offset therefrom toward the center of the surface of the cutting insert, a chip-forming groove extending full length parallel to the cutting edge, and along and parallel to the cutting edge separate chip-forming elements.

BACKGROUND OF THE INVENTION

Such cutting inserts are known for example from German 2,231,631. This publication also describes how premature breaking of the chips to form short chips is effected by a concave groove or grooves which are each formed arcuately or as semicircles seen in cross section. Above all the idea of a double groove is rejected as disadvantageous. For better chip breaking at least one projection is provided near the corner in a single groove.

German 2,515,686 describes a cutting tool where extending from the land is a descending flank which if necessary can also be part of a chip-breaking groove, rectangular or triangular shaped recesses being provided in the descending flank and extending to the region of the land. Raised part-spherical or frustoconical chip-forming elements with different basic shapes are also seen in U.S. Pat. No. 4,214,845, the chip-forming elements each being raised relative to the cutting edge and extending past them. Frustoconical chip-forming elements with generally triangular bases are seen in German 3,148,535, each being aligned to the base-surface limiting line of the chip-forming element in the direction of the adjacent cutting edge.

European 0,208,668 describes a cutting insert with recesses that are arranged at least partially in the curved chip-breaking surface (chip-breaking groove) and that extend beyond the chip-breaking groove into the region of the adjacent land. In a corresponding way for example European 0,168,555 or 0,222,317 describe cutting inserts with raised centers where semicircular projections extend from these raised centers toward and beyond the cutting edge. Oppositely the raised middle part (plateau) is provided on its rising flank with cutouts as described in U.S. Pat. No. 4,880,338.

All the above-discussed embodiments are supposed to improve chip breaking. The chip breaking basically relies on deforming the passing chip until it breaks. Chips that are of greater cross section are easier to break than skinny chips, and the chip thickness is above all dependent on the workpiece being machined or its composition. Further influence over chip breaking can be had via the curvature of the surface over which the chip passes. As the radius of the chip-breaking groove gets smaller the chip is more radically bent. The disadvantage of this is that the machining force and the load on the indexable cutting plate is increased. The additional forces from chip breaking lead to undesired vibrations in the machining process.

A further substantial possibility for influencing the chip is by imparting a crease to the chip cross section, either by bumps in the form of partial spheres, ribs, or the like or in the form of corrugations.

OBJECTS OF THE INVENTION

It is an object of the present invention to improve on the already described cutting insert so that the surface topography of the cutting surface is set up for different cutting circumstances and different workpieces, and in particular the shape should facilitate faster feed as well as a long tool service life.

SUMMARY OF THE INVENTION

A cutting insert for material-removing machining has a cutting surface formed with at least one transversely extending cutting edge, a transversely extending groove formation, a transversely extending land surface, and a row of transversely spaced outer chip-forming elements. The groove formation, which can be formed by two parallel grooves, extends along and generally the full length of the cutting edge and has an outer edge and an inner edge spaced longitudinally therefrom and lying between the outer edge and the cutting edge. The land surface extends immediately adjacent the cutting edge along the cutting edge between the groove formation and the cutting edge. The row of transversely spaced outer chip-forming elements lie in the groove formation wholly between the outer edge and the inner edge. If fast feed produces a relatively thick chip with a high resistance, this stiffness is further increased by the cup-shaped pits or bumps provided according to the invention. With relatively fast feed the chip engages the end of the second chip-forming groove without prior bending so that it is deflected. The chip breaks here since the resistance moment of the chip with higher feed rate is larger and thus, with the same bend angle of the chip, breaking takes place sooner. The succeeding chip-forming grooves thus make high feed rates possible and one and the same tool can be used to machine different materials with corresponding different chip formation during machining.

The service life of the cutting insert is of considerable meaning for sure machining. Recesses adjacent the cutting edge create a weakness and the danger of premature breaking of the cutter. For this reason it is of significance that the recesses are spaced from the cutting edge. The optimum is a spacing of the recesses from the cutting edge of 0.5 to 1 times the feed rate (mm/revolution).

Combinations are recommended wherein in the region set back from the cutting edge of the second or back chip-forming groove there are further pits and/or bumps. In particular with combinations of recesses adjacent the cutting edge with further recesses or bumps in the region remote from the cutting edge conditions are created whereby the chip is subjected to additional transverse forces, in particular when in the chip-travel direction the pits and/or bumps arranged one behind the other are offset laterally from one another. The transverse forces produced in this manner additionally promote chip breaking.

On the other hand the groove adjacent the cutting edge can have raised chip-forming elements (bumps) which while they in fact uniformly increase the cutting forces also have the advantage of forming a chip. The chip is of corrugated shape which the mentioned offset arrangement of the chip-forming element in the groove remote from the cutting edge subject them to additional transverse forces so that chip-breaking is enhanced.

In a further alternative embodiment of the invention at least two rows of raised and/or groove-shaped chip-forming elements extending perpendicular to the cutting edge in a single chip-forming groove and that the chip-forming elements one behind the other are offset laterally to each other. This embodiment also produces the above-described advantages of transverse forces during chip formation.

Finally according to a further embodiment of the invention two parallel to one another full-length chip-forming grooves are provided and raised or groove-shaped chip-forming elements are provided in the transition region of the chip-forming grooves.

Preferably the chip-forming elements are of different sizes, whereby in particular the chip forming elements in the region remote from the cutting edge are bigger than those near the cutting edge.

Preferably a cutting insert is used whose novelty is that each of the cutting corners bordering a main cutting edge has on the side of the main cutting edge an extension formed as a secondary cutting edge which is generally parallel to or slightly inclined at an angle of at most 10° to the longitudinal bore-hole axis. The secondary cutting edge has the effect that the bore-hole wall during advance of the cutter smooths the already produced bore-hole surface. Since during drilling a cutting corner describes a spiral curve, without the extension according to the invention there are in the bore-hole cross section two succeeding burrs at different positions which the secondary cutting edge smooths and removes. It is significant that the secondary edge for this removal extends generally parallel to the bore-hole axis or under a slight angle thereto. The inclination should preferably not exceed 1° to 2° relative to the bore-hole axis.

According to a further embodiment of the invention the length of the extension formed as a secondary blade corresponds generally to the feed length of one revolution of the drill, preferably with small drills to 20 mm bore-hole diameter up to 2/10 mm and with bigger drills to 60 mm bore-hole diameter up to 4/10 mm. The cutting-corner radius is preferably 0.2 mm to 1.2 mm.

The cutting corner can in this arrangement either be completely rounded or formed by short cutting-corner regions in the form of a chamfering.

The inventive cutting inserts can have on their main cutting edge one or more cutting corners. Preferably the cutting insert has at least two projecting cutting points per cutting edge so that a single indexable cutting plate has more than one cutting region for the chip, which produces better chip guiding. Such arrangement of this cutting plate leads also to better centering of the drill.

In particular according to a further feature of the invention the number of cutting regions is correspondingly large. This means for an indexable cutting plate with two cutting points that two cutting regions are formed by means of which smaller-diameter chips are formed which latter during drilling are easier to guide and easier to break.

According to a further embodiment of the invention each of the cutting edges has a generally concave shape with a setback which is preferably in the middle of the cutting edge. Unlike the conventional hexagonal cutting plate with obtuse angles between adjacent cutting edges in the shape of a "protuberance" according to the invention the middle of the cutting edge is offset backward relative to a line drawn between two adjacent cutting corners so that two cutting regions are created for each cutting edge. Preferably the setback produces two cutting-edge portions which have an outside angle of less than 176°. In particular this angle lies between 145° and 170°.

The cutting points of such a cutting edge can be formed by the cutting corners or adjacent cutting-edge portion halves. In both cases the cutting corners of such a cutting edge are near the corner. If the cutting point is formed by a cutting corner, it should be rounded. A cutting corner near the corner region can preferably be such that the corner has an enlarged corner angle. In this manner preferably the two corner points of a cutting edge are arranged somewhat in the respective cutting corner halves near the corners.

Cutting inserts of rhombic or triangular shape with a nose portion in one of the cutting corners or at least one main cutting edge connected with the nose portion wherein the nose portion is elongated in the ridge direction at an acute-angle cutting corner and which is formed by a plurality of curves segments which are arranged symmetrically to a centerline of the cutting corner are indeed known from European 0,162,029 but this cutting insert serves special, here not claimed, uses such as longitudinal turning, inside finish turning, relief grinding/turning, and outside finish turning. With this cutting insert the nose portion serves only as a shortened effective cutting edge so that this cutting insert is usable only for the intended purposes, not however for drilling.

Furthermore preferably the spacing of the setback from the cutting point lies relative to a vertical to connecting line of the cutting corners in the region between 0.1 mm and 1.8 mm. This spacing is intended to mean the spacing between two parallel lines one of which is drawn between the bottom of the setback and the other through the tops of the cutting points and which run parallel to a line connecting the cutting corners.

Preferably each cutting edge is formed axial symmetrical with respect to a perpendicular through its center.

The region of the described setback can be formed by appropriate formation of the cutting-plate side surfaces in the corners it is preferably rounded. In particular the cutting insert should be generally triangular or rectangular (seen in top view) and/or formed as an indexable cutting plate.

With respect to the formation of the side surfaces or free surfaces for forming a free angle as well as of the cutting surface one can reach back basically to the embodiments known form the art. The cutting surface can for example have adjacent the cutting edge a land and/or a chip-breaking groove as well as chip-forming elements.

In addition the present invention can also be embodied in such cutting inserts wherein the main blade is interrupted such that the cutting edge halves form an obtuse angle at the interruption. Even in this embodiment the cutting corner defining the cutting edge halves is formed with an extension serving as secondary cutting edge, the secondary cutting edge being generally parallel to a bisector of the obtuse angle or the bore-hole central axis or slightly inclined to one of these lines.

In particular according to a further embodiment of the invention such cutting inserts are claimed which have seen from above on the cutting surface a generally rectangular shape with two opposite side surfaces with their cutting edges so interrupted in the middle at their cutting points that they form an obtuse angle at the interruption and that each of the four formed cutting corners has an extension forming an auxiliary cutting edge which forms a projection relative to the longer side surface and that extends at an acute angle in the longitudinal side surfaces. The rectangular cutting-plate shape is known basically for example from European 0,181,844 but it lacks the cutting corners limiting the active blades at an auxiliary cutter that serves for smoothing the interior wall of the bore hole. According to the present invention there are no projections as in the cutting insert according to European 0,181,844 that form an acute angle with the long side surfaces, but the cutting corner has an actual secondary cutter before it forms an acute angle of preferably 15° to 25° to the side surfaces not constituted as cutters.

Preferably the cutting insert has a generally triangular or rectangular form and/or is formed as an indexable cutting plate.

BRIEF DESCRIPTION OF THE DRAWING

The above and other objects, features, and advantages will become more readily apparent from the following description, reference being made to the accompanying drawing in which:

FIG. 6b is an end view of the drilling tool according to FIG. 6a; and

SPECIFIC DESCRIPTION

Figure 1:
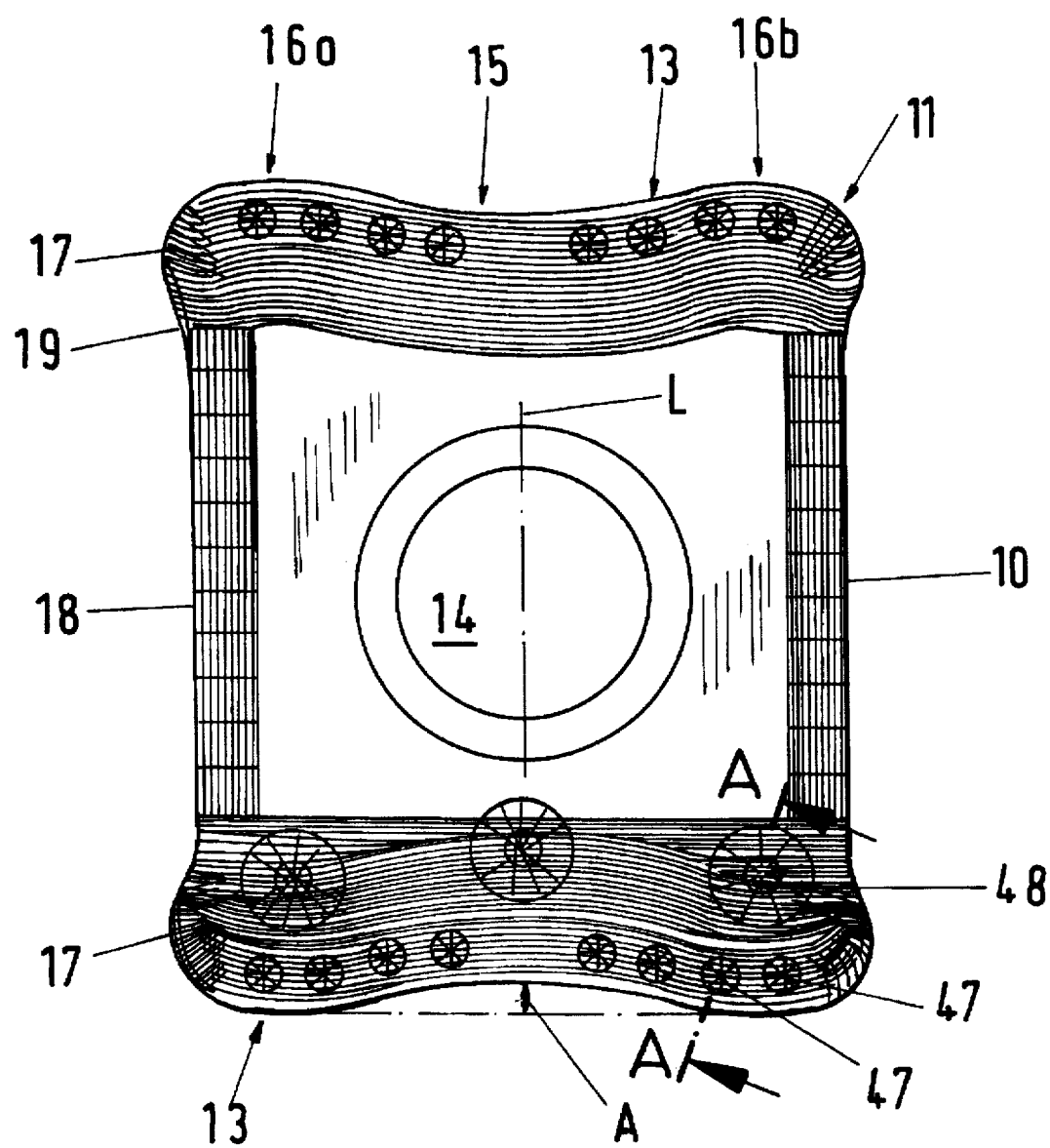
FIG. 1 is a top view of a cutting insert according to the invention with a basically rectangular shape.

The cutting insert 10 shown in FIG. 1 is basically rectangular with four cutting corners 11 which define the cutting surface as well as the cutting edges 13. As known in the prior art the cutting insert has a mounting hole 14. Each of the two opposite cutting edges 13 has a central depression 15 as well as symmetrically flanking the depression two cutting points 16a and 16b which here are rounded. Outside each corner 11 the cutting insert has extensions 17 which extend along the bore-hole axis or the here shown longitudinal axis L. These extensions 17 serve during boring as secondary cutting edges as described with reference to FIGS. 7a and 7b. The auxiliary cutting edge 17 has a length which corresponds generally to the advance length during one revolution of the drill, here in the neighborhood of $^4/_{10}$ mm. A land 19 which runs at an angle up to 25° bridges the long side surfaces 18.

Figure 1A:
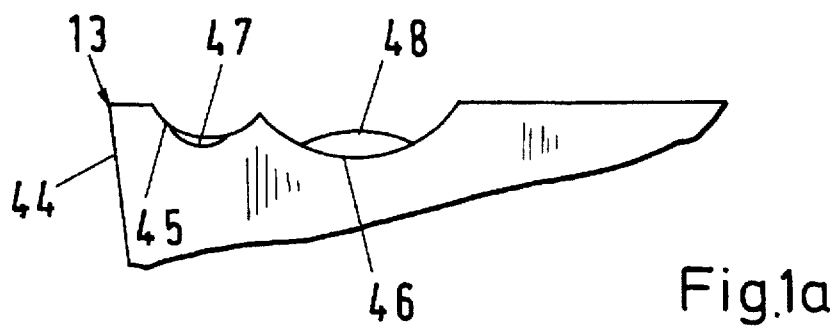
FIG. 1a is a partial section taken along line Ia—Ia of FIG. 1.

As visible from FIG. 1a, the cutting insert has adjacent a land at the cutting edge 13 two immediately adjacent chip-forming grooves 45 and 46 extending parallel to the cutting edge 13. The first chip-forming groove 45 has pits 47 which as seen from above are circular or, as shown, oval. The second chip-forming groove 46 has bumps 48 (raised chip-forming elements) which are of part-spherical shape and of greater diameter than the individual upstream chip-forming elements 47. Variations are possible where the pits or bumps in the two chip-forming grooves 45 and 46 are reversed, as shown in FIG. 1 there are bumps 48 in the first chip-forming groove and pits in the second chip-forming groove 46. The chip-forming elements 47 and 48 are offset from each other which is shown in FIG. 1 with reference to the maxima and minima.

Figure 1B:
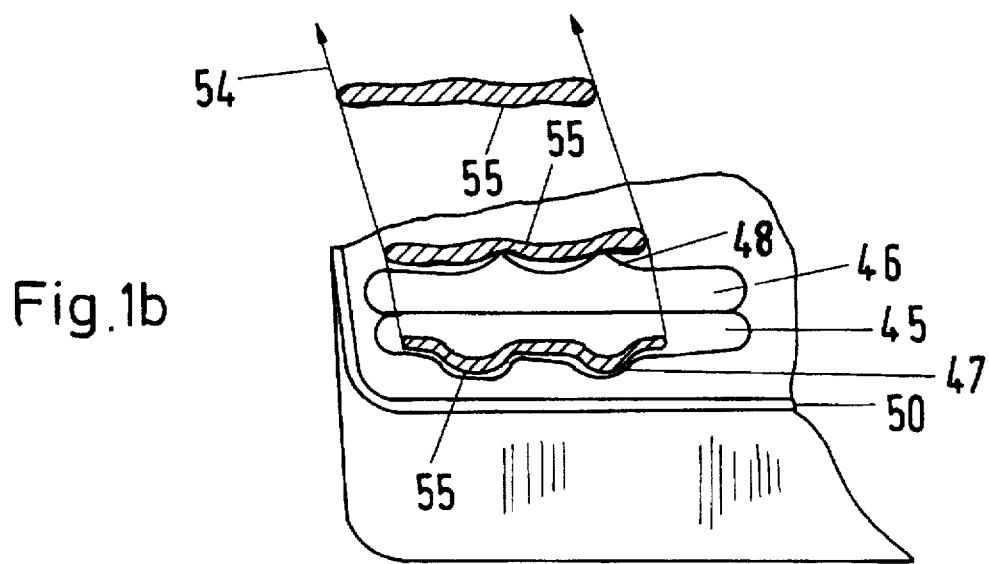
FIG. 1b is a sectional partial view of a cutting insert showing the passing chip in three succeeding positions.

FIG. 1b shows three longitudinal sections through the passing chip on contact with the chip-forming elements near the cutting edge, that is the pits 47, as well as on contact with the chip-forming element remote from the cutting edge, the bumps 48 as well as in a position free of the cutting surface. A double groove 45, 46 is formed adjacent the land 50 in the present case so that the cutting surface is shown in perspective in order to make the chip-travel direction (arrow 54) clear. FIG. 1b in particular makes clear that the bumps 48 are somewhat laterally offset in the chip-travel direction from the pits 47 so that the chip as it contacts the chip-forming elements remote from the cutting edge is subjected to an additional lifting or bending.

Figure 2A:
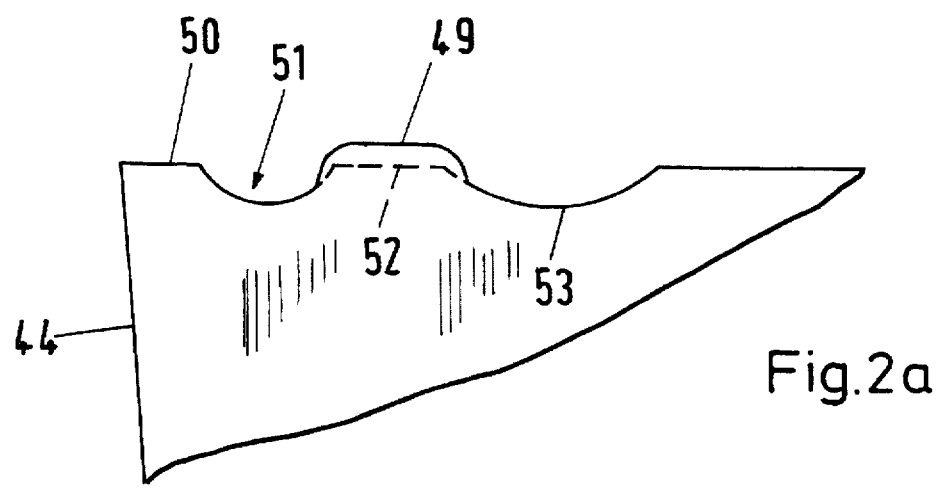
FIG. 2a is a partial section taken along line IIa—IIa of FIG. 2.
Figure 2:
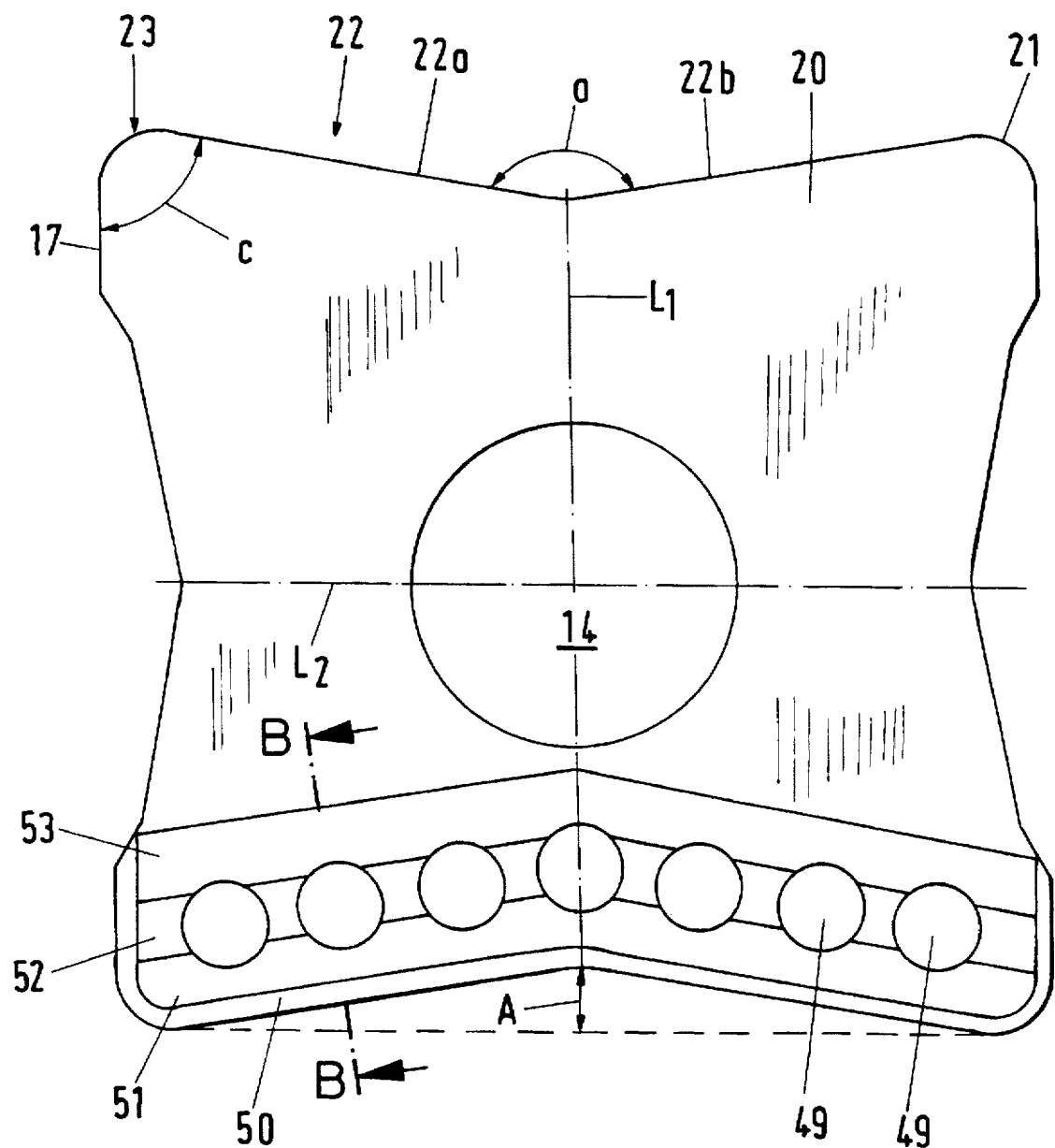
FIG. 2 is a top view of an alternative embodiment of a generally rectangular cutting insert.

FIG. 2 shows a variation on the described cutting insert. This cutting insert is in contrast to the cutting insert according to FIG. 1 not elongated but square with the cutting insert 20 having once again four cutting corners 21 with intervening cutting edges 22 whose cutting-edge partial portions 22a and 22b form an angle a of about 160° to each other. Thus per cutting edge in the corner region there are two cutting points 23 which form a cutting-corner angle c of about 70°. An extension 17 is formed from the cutting edge 23. The cutting insert is mirror-symmetrical to the longitudinal axes $L_1$ and $L_2$. The section according to line IIa—IIA according to FIG. 2a shows that there is a first chip-forming groove 51 at the land 50, then a ridge 52 at the same height as the land 50 on which there are raised chip-forming elements 49 whose size is such that they project into the front chip-forming groove 51 as well as into the further chip-forming groove 53 arranged behind the ridge 52 parallel to the cutting edge 13.

Further embodiments of the cutting insert are shown in the following, for clarity's sake without chip-forming elements whose shape can be the known from the state of the art in particular as known from the references cited in the introduction.

Figure 3:
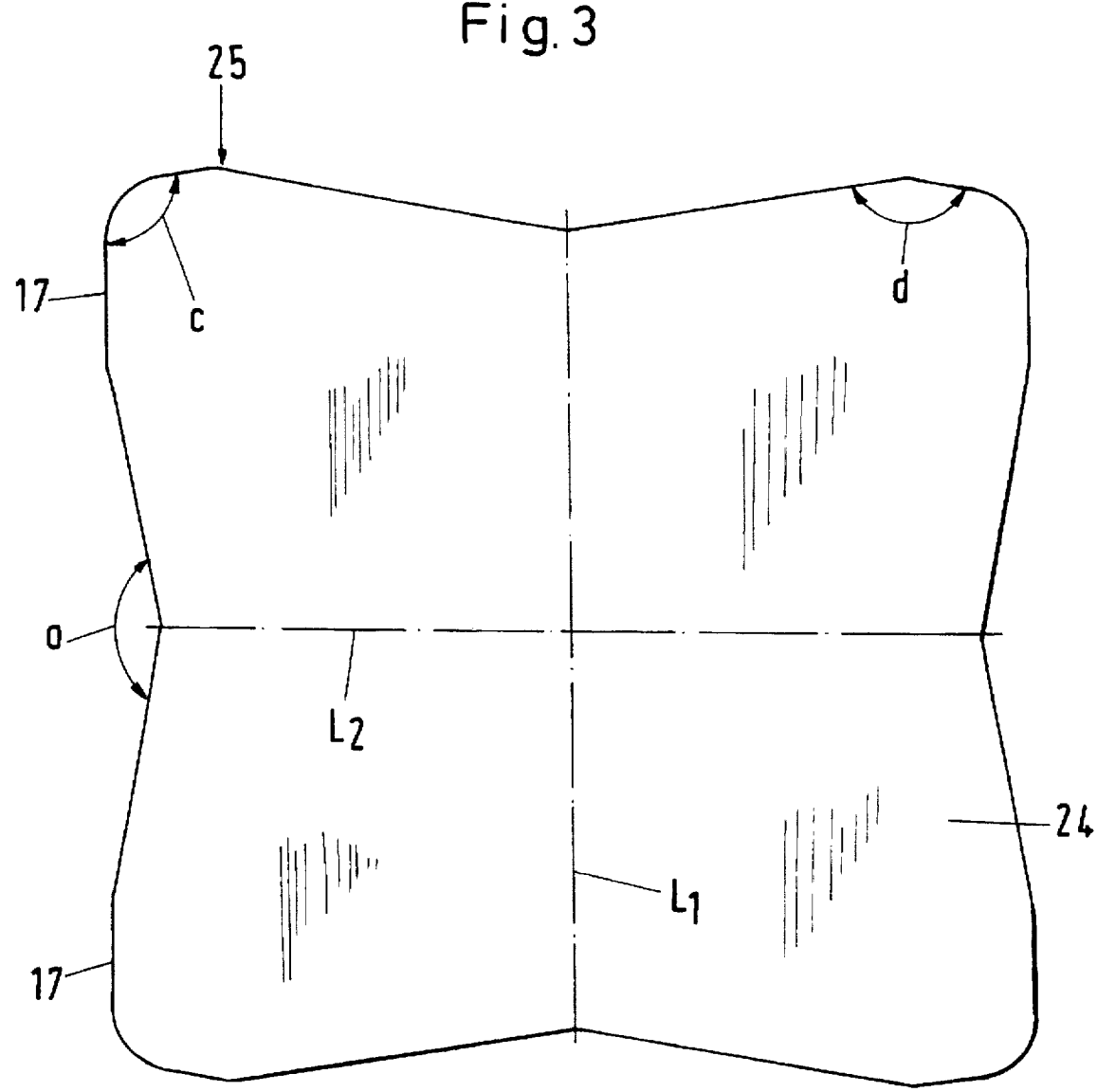
FIGS. 3 and 4 show other basic shapes of a rectangular cutting insert.

An embodiment of the cutting insert according to FIG. 2 is seen in FIG. 3. Even here there is axial symmetry to the axes $L_1$ and $L_2$ but the cutting insert 24 has no rounded points 16a and 16b or 23 but respective points 25 which are each arranged at an angle d of about 160° from the outer portion of the main cutting edge. The extensions 17 are here convexly curved without violating the principles of the invention of using these extensions 17 as slide surfaces.

Figure 4:
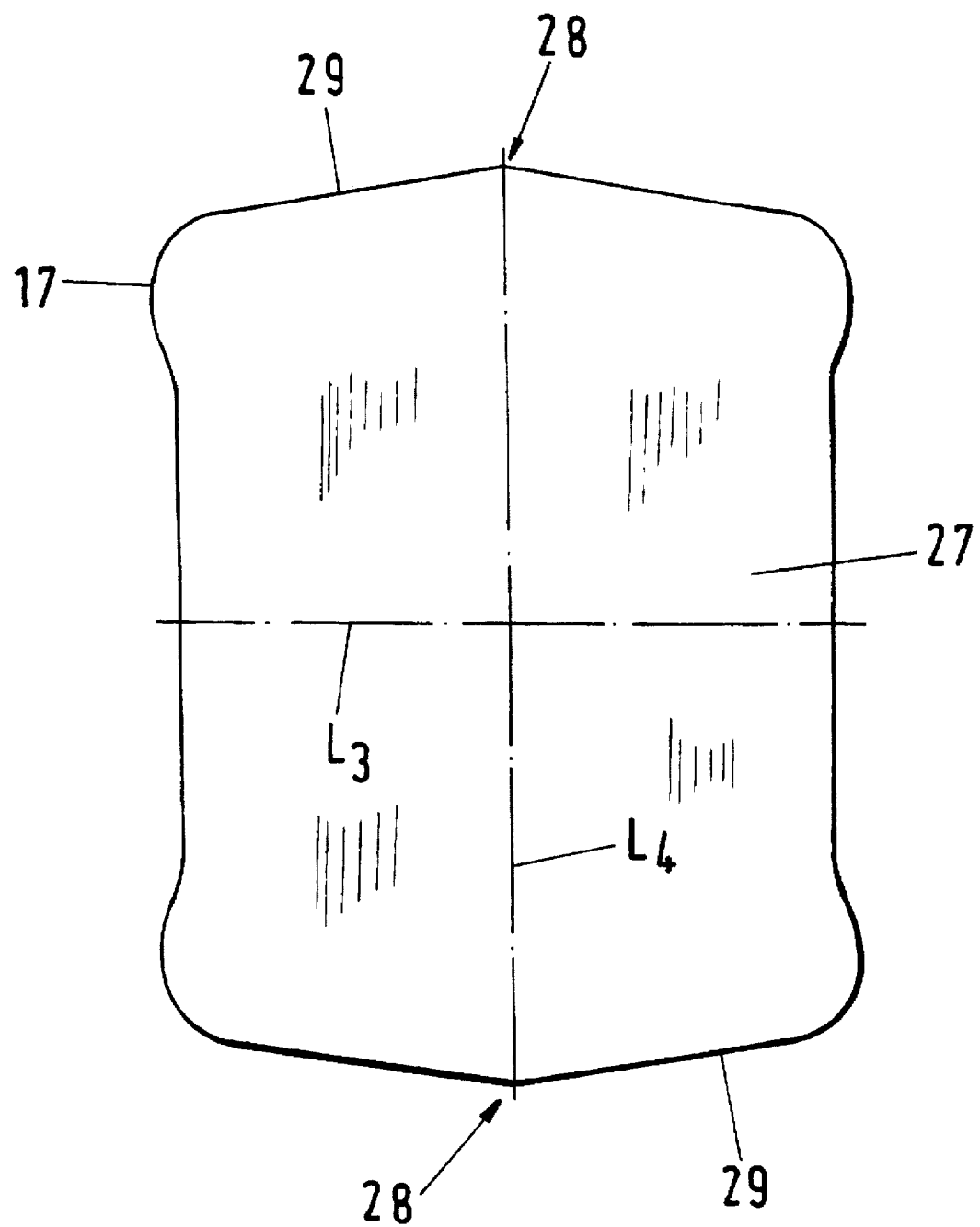

The cutting insert of FIG. 4 corresponds generally to the cutting insert according to FIG. 1 and is also formed as an elongated rectangle. Each of the cutting edges 29 which extend mirror-symmetrically to a transverse axis $L_3$ has a cutting point 28 which is central and forms an obtuse angle. The side surface abutting the cutting edge 29 is correspondingly interrupted. Even in this embodiment the cutting edge 29 has on each cutting corner an extension 17 which is aligned parallel to the drillhole longitudinal axis or to the longitudinal axis $L_4$.

Figure 5:
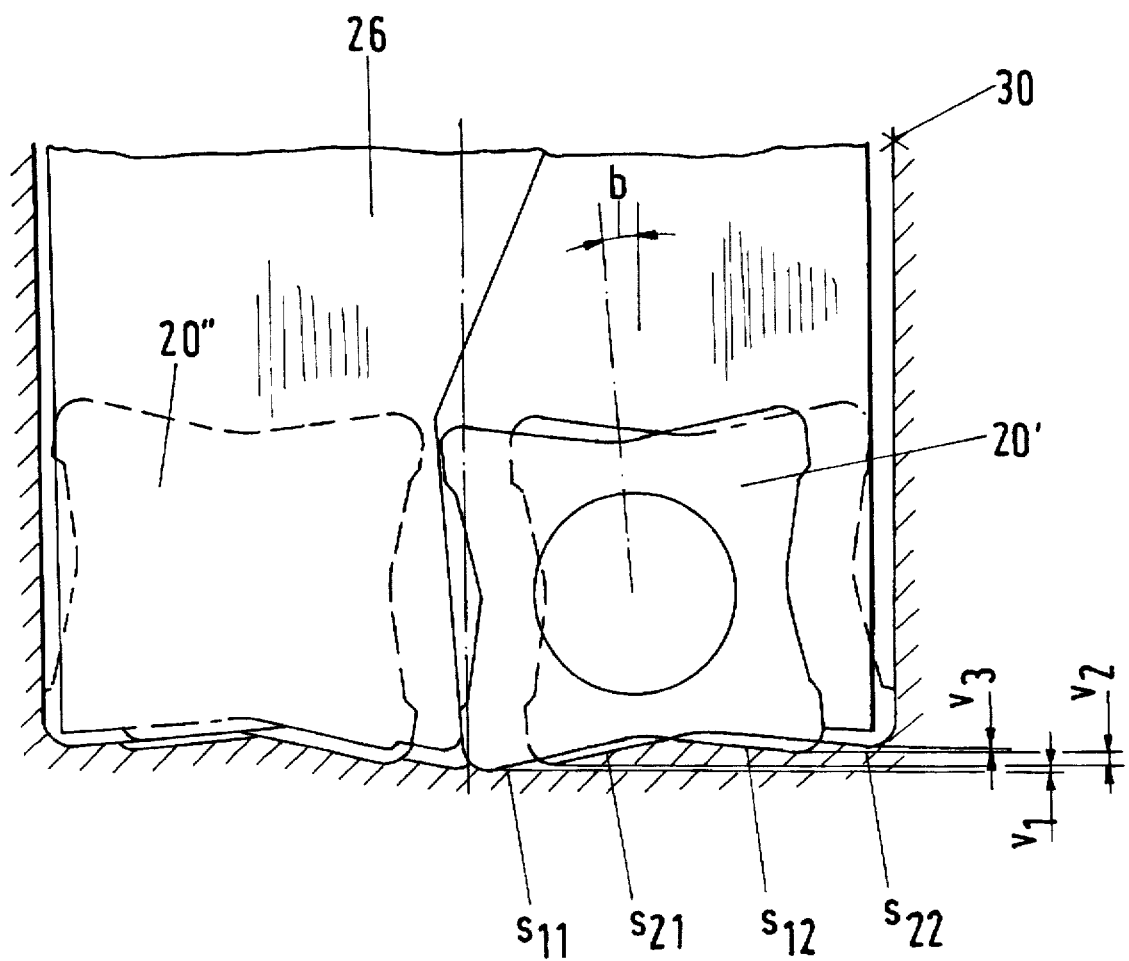
FIG. 5 is a sectional view of a drilling tool in use with three cutting inserts according to the invention.

A drilling tool according to the invention that is equipped with two cutting inserts 20 as in FIG. 2 is shown in FIG. 5. A shaft 26 carries on each of its opposite bit halves a respective cutting insert 20' or 20" with the working regions of these cutting inserts overlapping as is shown on the right bit half in dot-dash lines for the cutting insert 20". The bit seats are offset by 180°. The inner cutting insert 20' extends slightly past the bit longitudinal axis and is, with respect to its perpendicular, tipped at an angle b of about 5° to the connecting line of the cutting corner defining the effective cutting edge with respect to the shaft longitudinal axis like the corresponding perpendicular of the other cutting insert.

The cutting insert 20" is also set back somewhat, about 0.1 mm, with respect to the cutting insert 20'. During drilling in solid material 30 on contact of the bit the blade $s_{11}$ or the inner cutting corner of the bit contacts the workpiece 30 first. According to what angle b was selected for the two cutting inserts and the extent of the setback $v_1$ of the outer cutting insert 20" relative to the inner cutting insert 20' the first cutting edge $s_{21}$ of the outer cutting insert 20" leads with its point the point of the particle-cutting region $s_{12}$ by the distance $v_2$ which also corresponds to 0.1 mm. In each cutting insert 20' and 20" the respective cutting regions $s_{11}$ and $s_{12}$ or $s_{21}$ and $s_{22}$ form guide surfaces so that during drilling there are altogether two chips per cutting-insert plate.

Figure 6A:
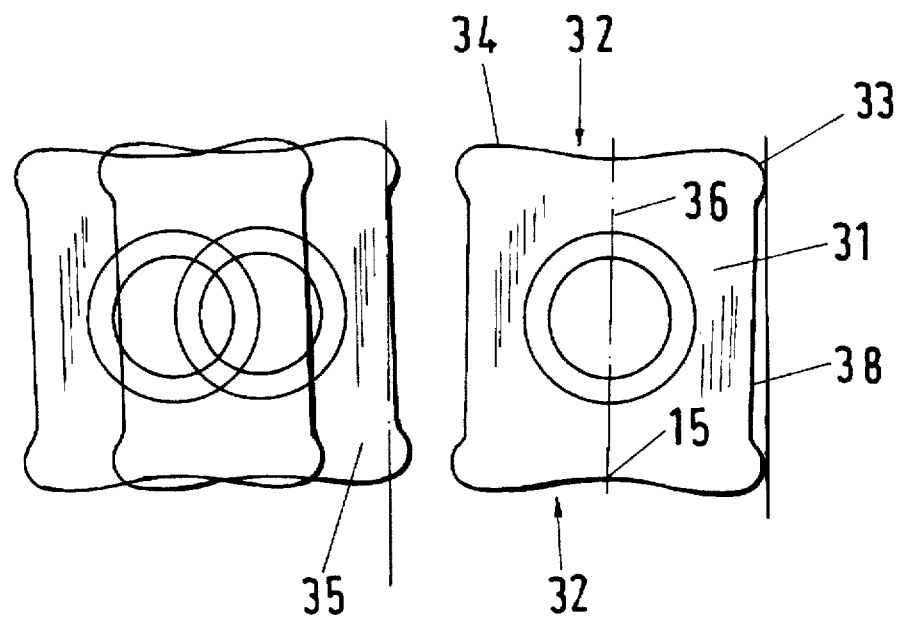
FIG. 6a is a sectional view of a drilling tool.
Figure 6B:
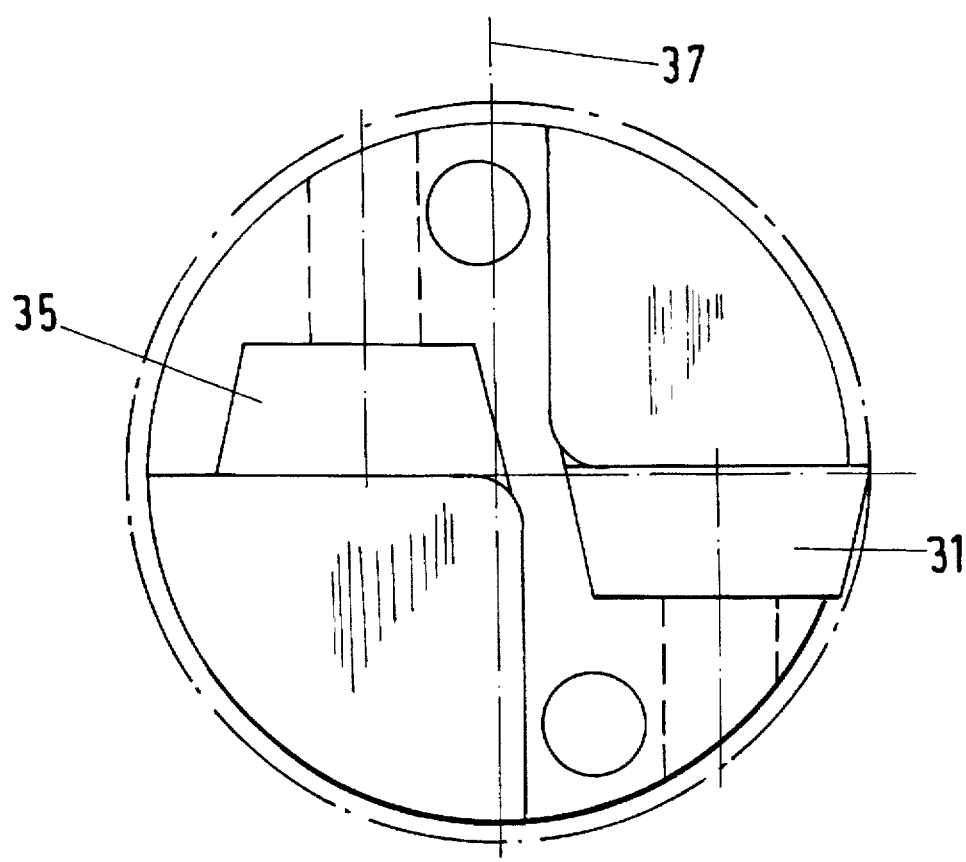

A cutting insert according to the embodiment shown in FIG. 1 is shown in FIGS. 6a and 6b. The cutting insert 31 has two cutting edges 32 on opposite sides, one of them having in the cutting edge center a concave shape. Widening of the cutting corners 33 forms two cutting points 34 per cutting edge 32 which are formed rounded. The 180° offset mounting position of the cutting inserts 31 and 35 is shown in FIG. 6b. Both cutting inserts 31 and 35 have their central longitudinal axes 36 tipped relative to the bit-longitudinal axis 37 by an angle of 5°. The long side surfaces 38 of the cutting inserts 31 and 35, which are not constituted as cutting edges, can be of the same size or longer than the cutting edge 32.

Figure 7A:
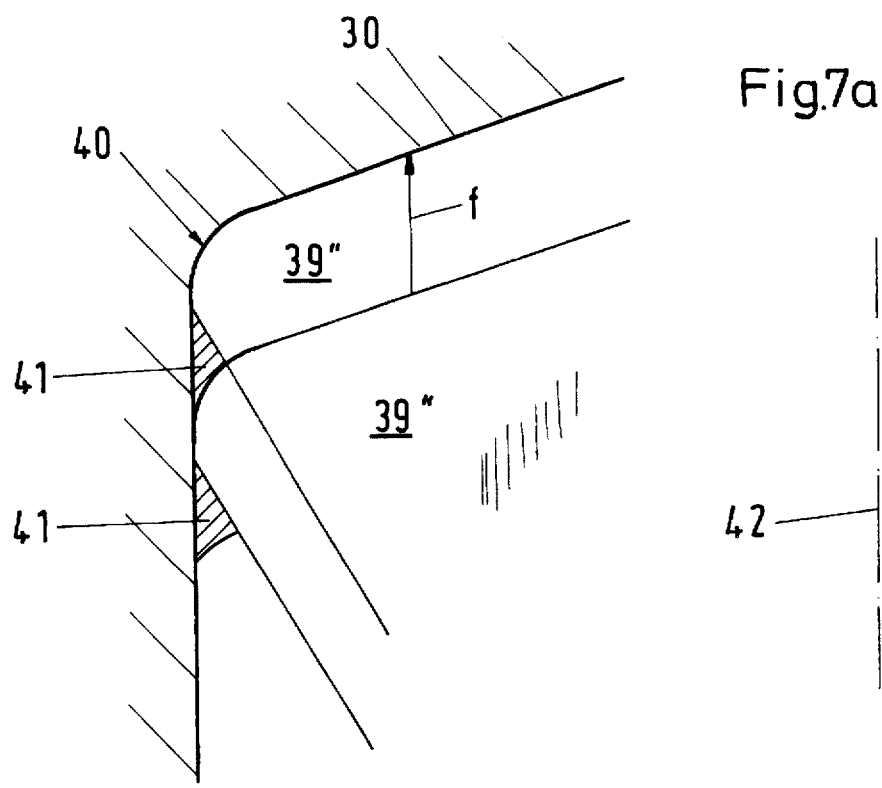
FIGS. 7a and 7b are partial sections of a cutting insert advancing in a drill hole.
Figure 7B:
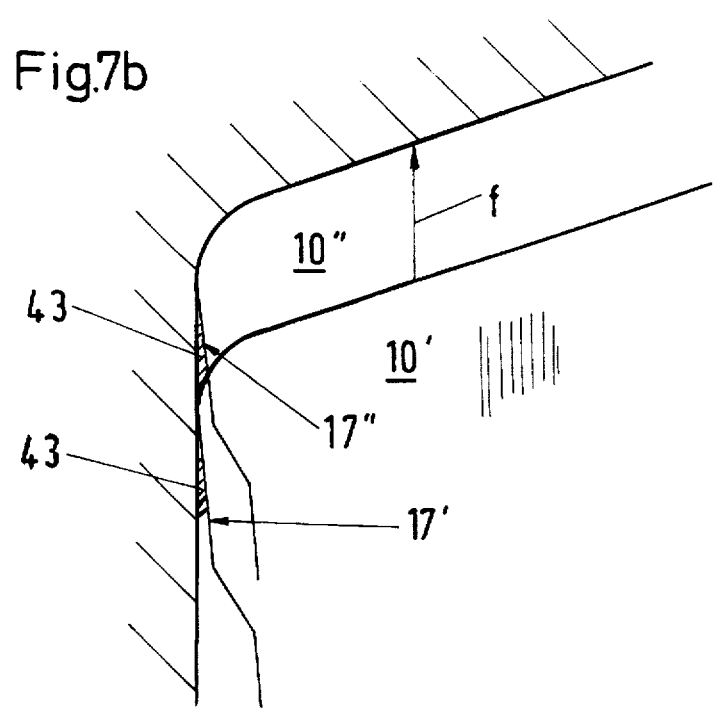

The operation of the extensions 17 is seen in FIGS. 7a and 7b. The cutting insert shown partially in FIG. 7a is advanced on drilling in solid metal by a drill advance f with the positions of the cutting inserts being shown at 39' and 39" after one revolution of the bit. The cutting corner 40 of this cutting insert describes during bit advance an actual helix that forms a burr 41 whose size is determined by the cutting-corner angle. Reference 42 shows the respective drilled-hole axis. On use of a cutting insert according to the invention and corresponding to the representation of FIG. 7b the extension smooths the burr extension 41 while the remaining burr 43 is so small as almost to disappear.

We claim:

1. A cutting insert for material-removing machining, the insert being formed with:
    at least one transversely extending cutting edge;
    a transversely extending inner groove extending along and generally the full length of the cutting edge and having an outer edge and an inner edge spaced longitudinally from the outer edge and lying between the outer edge and the cutting edge;
    an outer transversely extending groove extending along and generally the full length of the cutting edge and having an outer edge and an inner edge spaced longitudinally from the respective outer edge, the inner groove lying between the outer groove and the cutting edge;
    a transversely extending land surface extending immediately adjacent the cutting edge along the cutting edge between the inner groove and the cutting edge; and
    a row of transversely spaced outer chip-forming elements lying wholly between the outer-groove outer edge and the inner-groove inner edge.

2. The cutting insert defined in claim 1 wherein the elements are bumps.

3. The cutting insert defined in claim 1 wherein the elements are recesses.

4. The cutting insert defined in claim 1 wherein the elements are wholly in the outer groove, the insert further comprising:
    a row of transversely spaced inner chip-forming elements lying wholly in the inner groove between the respective outer edge and the respective inner edge.

5. The cutting insert defined in claim 4 wherein the elements in the outer groove are formed differently from the elements in the inner groove.

6. The cutting insert defined in claim 5 wherein the elements in the outer groove are bigger than the elements in the inner groove.

7. The cutting insert defined in claim 5 wherein the elements of one of the rows are bumps and the elements of the other of the rows are recesses.

8. The cutting insert defined in claim 1 wherein the elements are mainly between the outer groove and the inner groove.

9. The cutting insert defined in claim 1 wherein the insert is formed with a pair of cutting corners each having one side defined by the cutting edge and an outer side formed with a longitudinal extension having a surface extending generally perpendicular to the cutting edge.

10. The cutting insert defined in claim 9 wherein the outer side surfaces extend at an angle of between 1° and 2° to a longitudinal axis of the insert.

11. The cutting insert defined in claim 9 wherein the corners are circularly rounded and have a radius of curvature of between 0.2 mm and 1.2 mm.

12. The cutting insert defined in claim 9 wherein the one sides are straight.

13. The cutting insert defined in claim 9 wherein the cutting edge has a center recess between the one sides.

14. The cutting insert defined in claim 9 wherein the one sides extend at an angle of between 150° and 170° to each other.

15. The cutting insert defined in claim 14 wherein the one sides meet at a location spaced between 0.1 mm and 1.8 mm longitudinally behind a straight line joining the two corners.

16. The cutting insert defined in claim 9 wherein the insert is symmetrical about a longitudinal axis equidistant between the corners.

17. The cutting insert defined in claim 9 wherein the cutting insert has two such cutting edges directed longitudinally oppositely and formed with respective such grooves and elements, the insert being symmetrical to a transverse axis extending transversely midway between the two edges.

18. The cutting insert defined in claim 9 wherein the one sides form an obtuse angle and a longitudinally forwardly directed central point.

19. The cutting insert defined in claim 9 wherein the insert has longitudinally inset side edges set in from the extensions and with surfaces extending at an angle of between 15° and 25° between each of the side edges and the respective extension.

20. A cutting insert for material-removing machining, the insert being formed with:
    at least one transversely extending cutting edge;
    an inner transversely extending groove extending along and generally the full length of the cutting edge and having an outer edge and an inner edge lying between the respective outer edge and the cutting edge;
    an outer transversely extending groove extending along and generally the full length of the cutting edge and having an outer edge and an inner edge spaced longitudinally therefrom and lying between the respective outer edge and the inner groove, the inner groove lying between the outer groove and the cutting edge;
    a transversely extending land extending immediately adjacent the cutting edge along the cutting edge between the inner groove and the cutting edge; and
    a row of transversely spaced outer chip-forming elements lying mainly between the outer groove and the inner groove and wholly between the outer-groove outer edge and the inner-groove inner edge.

* * * * *